United States Patent [19]

Schönfeld et al.

[11] Patent Number: 4,543,825
[45] Date of Patent: Oct. 1, 1985

[54] PROCEDURE FOR BALANCING OF ROTORS WITHOUT JOURNALS

[75] Inventors: Harald Schönfeld, Darmstadt; Angelo Bauer, Rossdorf, both of Fed. Rep. of Germany

[73] Assignee: Carl Schenck A.G., Fed. Rep. of Germany

[21] Appl. No.: 530,419

[22] Filed: Sep. 8, 1983

[30] Foreign Application Priority Data

Sep. 25, 1982 [EP] European Pat. Off. ........ 82108883.8

[51] Int. Cl.⁴ ............................................. G01M 1/16
[52] U.S. Cl. ........................................ 73/459; 73/472; 73/473
[58] Field of Search ............... 73/459, 460, 462–479, 73/487

[56] References Cited

U.S. PATENT DOCUMENTS

| | | | |
|---|---|---|---|
| 1,486,115 | 3/1924 | Allen | 73/475 X |
| 2,353,150 | 7/1944 | Dietz | 73/472 |
| 2,748,603 | 6/1956 | Wilcox | 73/465 |
| 4,040,300 | 8/1977 | Negard | 73/459 |

FOREIGN PATENT DOCUMENTS 542436 11/1973 Switzerland.

*Primary Examiner*—Stewart J. Levy
*Assistant Examiner*—John E. Chapman, Jr.
*Attorney, Agent, or Firm*—Connolly and Hutz

[57] ABSTRACT

A procedure is described for the balancing of rotors without journals, as well as an auxiliary bearing arrangement used to accomplish the balancing of such rotors. Fluids function to separate the rotor being balanced from the journal exterior of the bearing arrangement and also to separate the rotor from the support surface of the bearing arrangement. A high level of precision is achieved while avoiding fixed or expanding mandrels. Improvement of the automated operation of balancing machines of this type is possible without wear on the machine. Also, additional disturbance frequencies are avoided.

2 Claims, 6 Drawing Figures

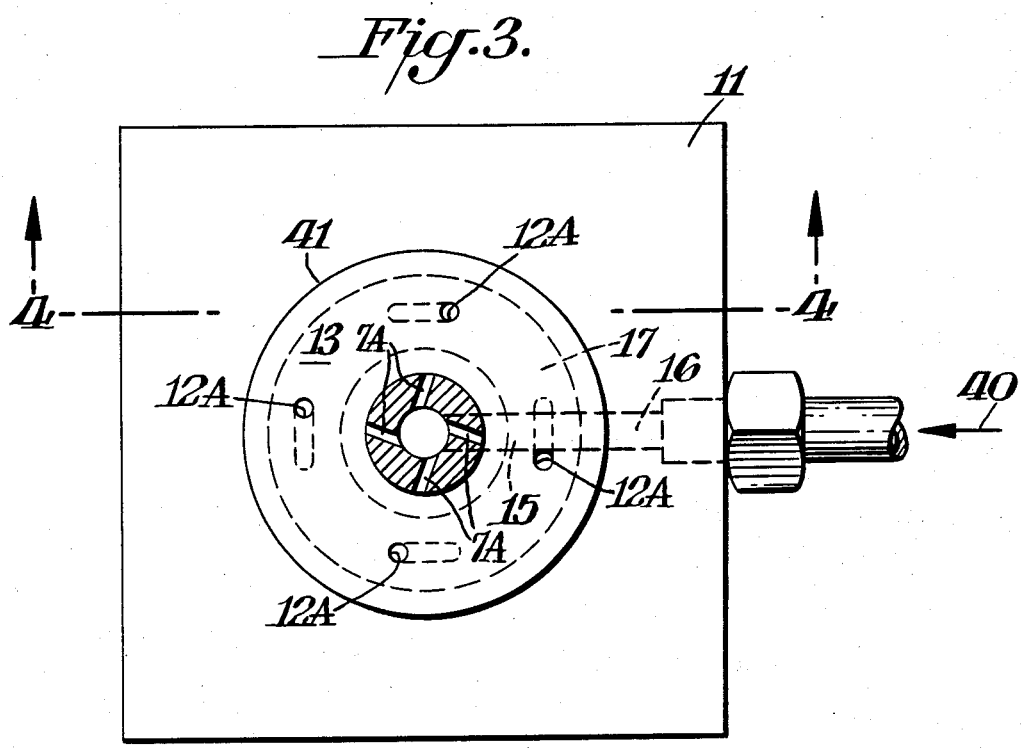
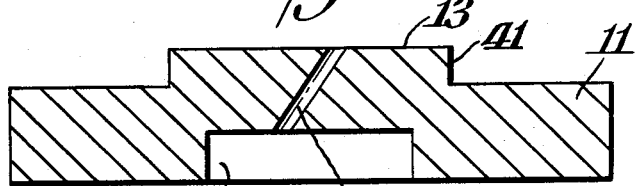
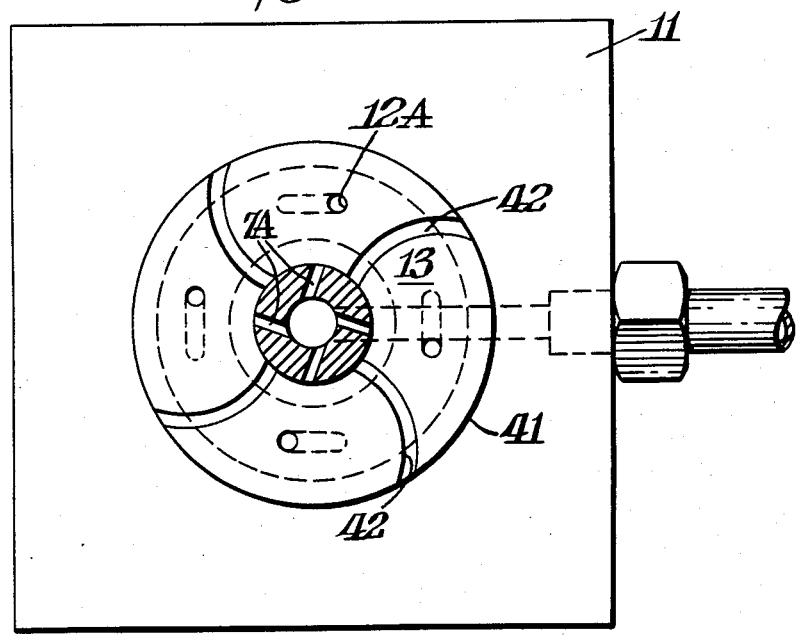

PROCEDURE FOR BALANCING OF ROTORS WITHOUT JOURNALS

BACKGROUND OF THE INVENTION

The present invention concerns a procedure for the balancing of rotating bodies (rotors without journals).

In balancing, rotating bodies without their own shafts and journals create special problems with respect to the quality of balancing that can be achieved, since according to proper definitions in balancing technology, such bodies are not truly rotors. Only a true rotor, i.e. a rotor with shaft and a journal, can be precisely balanced with respect to its bearing locations. For instance, a flywheel which has no immediate bearings, or a fan with a bore, could at best be brought to a balance quality determined by the possible distance between the axis of rotation on an auxiliary balancing arbor and the axis of rotation of the rotor to which it is attached while in operation, thus, in general no better than $5\mu m$. However, there does exist a 180° index balancing procedure which permits detection and elimination of the locating error on an auxiliary arbor. It requires a compensation device built into the measuring system, and it is explained in operation manuals referring to balancing machines for single rotor stages of jet engines (*Balancing Technology*, Vol. I, Springer, 1977). However, this procedure is not suitable for eliminating errors which occur due to fit tolerances when the balanced body is attached onto its operational shaft. To date, these errors have been accepted.

SUMMARY OF THE INVENTION

With this background, the purpose of the invention herein is to suggest a balancing procedure for bodies without journals as well as a device for this purpose, thereby eliminating the need for rotating auxiliary arbors. According to the invention, a hydro-static bearing is used to support the body on the balancing machine, i.e. fluid under pressure is introduced between the exterior surface of a non-rotating arbor and the inside surface, i.e. bore of the body being balanced. The characteristics of the hydro-static bearing eliminate the effects of fit tolerances and surface irregularities and provide a stable axis of rotation for the body. Further, the characteristic of the hydro-static bearing in axial direction provides a stabilization in respect to the unbalance correction planes on the rotating body, eliminating the need for additional auxiliary actions.

The development of a hydro-static bearing arrangement and a drive for balancing rotating bodies without their own journals is achieved with the structure of the present invention. Fluid openings in the non-rotating arbor of the bearing arrangement can be in the form of bored passage holes, or the entire non-rotating arbor in the area of the bearing may consist of porous material through which fluid flows. The flow through the openings is determined with respect to the shape and the weight of the rotating body to be balanced. The type of fluid used may be gaseous or liquid, such as compressed air, water, or oil, for example.

In one form of the invention the non-rotating arbor is shaped to accommodate rotating bodies with stop collars inside the central axial bore. In such case the non-rotating arbor has different diameters along its length that complement the shape of the central axial bore of the rotating body being balanced.

A plate arranged perpendicular to the shaft axis of the non-rotating arbor creates a reproducible bearing plane and, consequently, reproducible correction planes on the rotating body. Also, the passageways for the fluid may be arranged so that the fluid serves as a drive for the rotor to be balanced without an additional outside drive. Moreover, the axis of the non-rotating arbor may be vertically or horizontally arranged.

Thus, in the area of balancing machinery, the object of the invention offers reproducible balancing of rotating bodies without shafts and journals by means of fluid bearings and simultaneous fluid drive, with a balancing precision that has heretofore not been possible. Such balancing is accomplished without wear on the non-rotating arbor and the drive. By using the hydro-static bearing arrangement of the present invention, automation of the process of loading and unloading of the rotating body into a balancing machine is also significantly facilitated. The non-rotating arbors according to the invention have outlet openings for fluids, and the distance between the arbor surface and the inside diameter of the rotating body can be selected so that wear damage is avoided. As explained at the outset, the heretofore used rotating arbor arrangements with fixed or expanding arbors did not give sufficiently reproducible measurement results, or they did cause damage to the axial bore of the rotating body being balanced, particularly when such balancing machines were automated. Also, high precision balancing was not possible with such known balancing procedures.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein similar reference characters refer to similar parts and in which:

FIG. 3 is a sectional top plan view similar to FIG. 2 illustrating another embodiment of the invention;

FIG. 4 is a sectional view taken along line 4—4 of FIG. 3;

FIG. 6 is a sectional top plan view similar to FIG. 3 illustrating another embodiment of the invention.

DETAILED DESCRIPTION OF THE INVENTION

Figure 1:
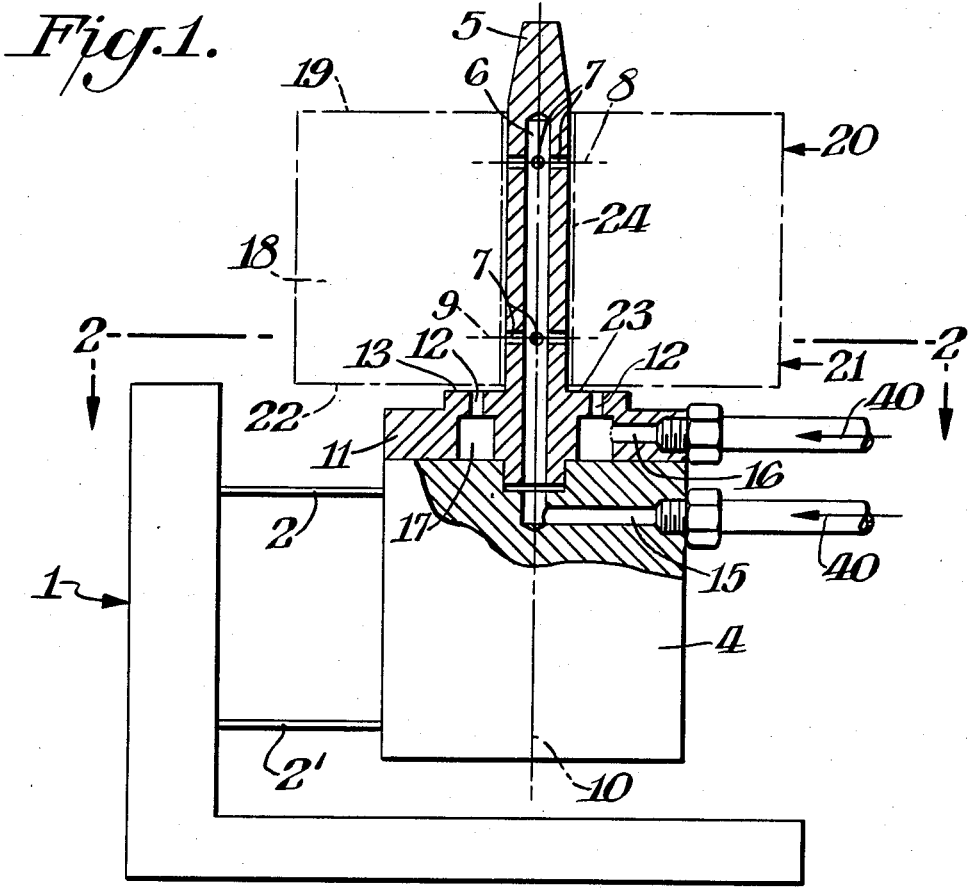
FIG. 1 is a front elevational view of a balancing machine with a hydro-static bearing arrangement according to the invention, with portions broken away to show detail.
Figure 2:
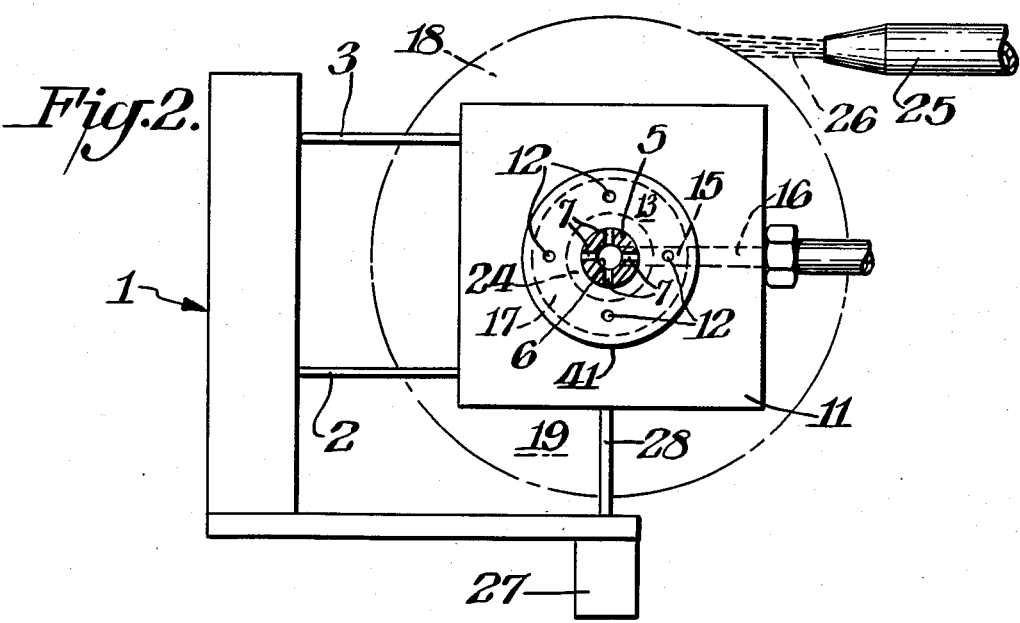
FIG. 2 is a sectional top plan view taken along line 2—2 of FIG. 1, and showing an alternative drive for the rotating body.

Referring in more particularity to the drawings, FIGS. 1 and 2 illustrate a balancing machine 1 including a swing bridge 4 supported by means of four support springs 2, 2', 3, 3'. The swing bridge 4 has a vertically arranged non-rotating arbor 5 and and a central axial fluid manifold 6. Several passages 7 are provided in several radial planes 8, 9.

Secondary passages 12 are provided in a plate 11 arranged perpendicular to the axis 10 of the non-rotating arbor 5. The passageways 12 end at the upper surface 13 of the plate 11. The plate 11 has a collar 41. The central axial manifold 6 and the secondary passages 12 are supplied through intake bores 15, 16. In the balancing machine, four secondary passages 12 are provided, and each is supplied with fluid 40 via a circular conduit 17. In the example shown, air is used as a bearing and drive fluid, and by means of the separate arrangement of the channels for the central axial manifold 6 and the secondary passages 12, it is possible to vary the correct fluid quantities to be introduced. As such a stable axis of rotation is formed for the rotating body 18. Also, a stable position of correction planes 20, 21 on the rotating body can be maintained in relation to the upper surface of the plate 11 since the hydro-static bearing effect is stabilized in the axial direction.

FIG. 4 illustrates a section through a secondary fluid passage 12A having a skewed or inclined orientation from the circular conduit 17 to the surface 13 of the plate 11. With this arrangement a drive impulse is exerted on the lower end section 22 of the rotating body 18, so that the latter assumes a rotational movement on the air support cushion 23 formed by the flow out of the passages 12A.

In a similar manner, the oblique passage 7A shown in FIG. 3 subject the inside 24 of the bore in the rotating body 18 to a rotational impulse. The result is that the fluid 40 simultaneously provides the drive for the rotating body 18 to be balanced without any other drive. Due to this effect, a balancing machine 1 with a swing bridge 4 and equipped in this manner according to the invention has no revolving parts except for the rotating body 18 which rotates by itself. Hence, one completely avoids a major portion of disturbing frequencies on the unbalance measurements, which are caused by rotating auxiliary devices on the balancing machine.

FIG. 2 schematically shows an alternative drive for the rotating body 18 which is illustrated in phantom outline. Here, the drive effect comes from an air nozzle 25 by means of its air flow 26 which tangentially touches the rotating body. This example also shows that in the alternative auxiliary drive, no rotating component is used which might cause additional disturbing frequencies on the unbalance measurement.

The application of self-contained drive such as the inclined passages 7A, 12A or an outside drive such as air nozzle 25 depends on the quality of the outside surface of the rotating body 18. Both drive methods can be used for a constant drive speed of the rotating body.

FIG. 2 also shows a vibration pick-up device 27 which measures the vibrations of the swing bridge 4 caused by the unbalance of the rotating body 18 and evaluates these vibrations together with information on the speed, the phase location, and information concerning the correction planes 20 and 21. A counter device (not shown) may be used to count the revolutions of the body 18. Ultimately, the unbalance of the rotating body 18 is known with respect to position and magnitude and such unbalance can be corrected by an additional procedure on the rotating body 18. Should this be a question of a correction in several planes, a second vibration pick-up device is required instead of the single device.

Figure 5:
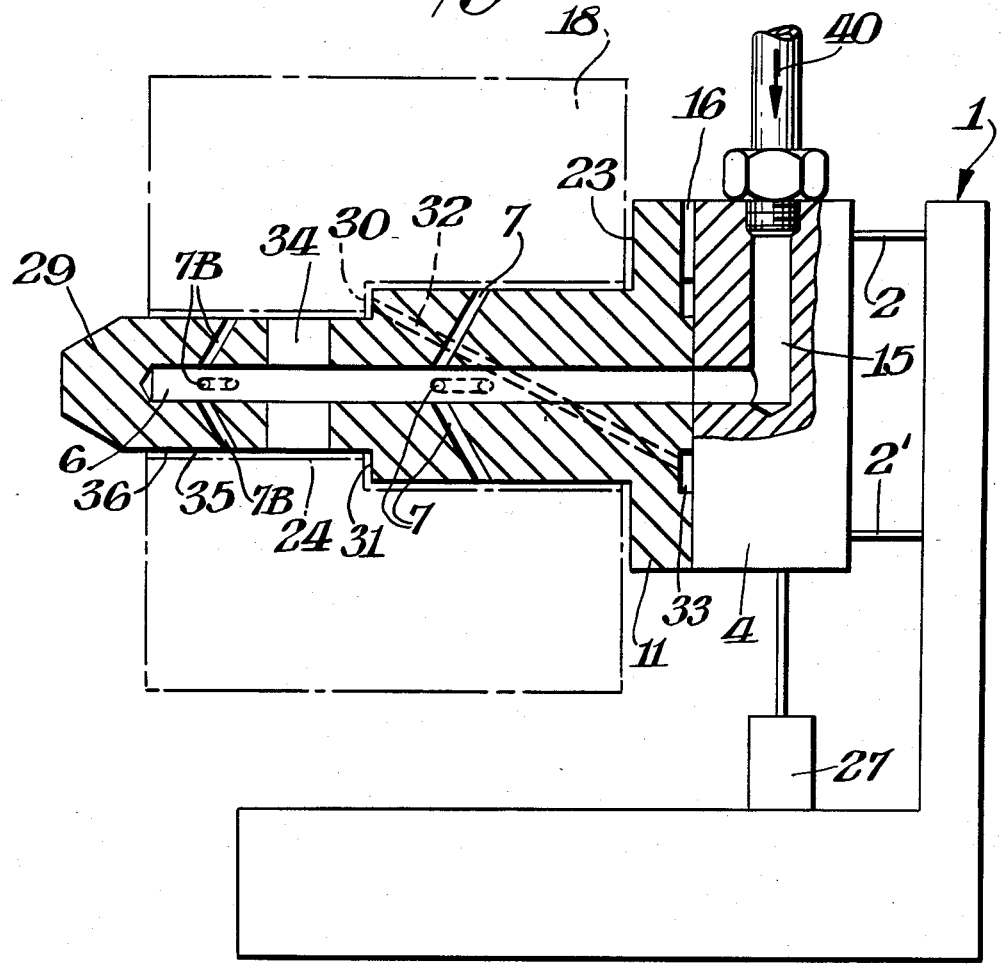
FIG. 5 is a side elevational view of another balancing machine with a hydro-static bearing arrangement, according to the invention, with portions broken away to show detail.

As shown in FIG. 5, the hydro-static bearing arrangement is not limited to a vertical installation, but horizontal installations can also be equipped with a similar arrangement.

FIG. 5 illustrates a stepped non-rotating arbor 29 which also has a central axial manifold 6 and from which passages 7B branch out a different locations exiting into the opening 35 and angled toward the plate 11. When the rotating body 18 has a shoulder 30 on the inside of the bore 24, a stepped arbor 29 is used in the balancing machine. A collar area 31 on the stepped arbor 29 is supplied with fluid 40 via skewed additional secondary passages 32. This produces a support and a drive for the rotating body 18. The passages 32 are angled similar to passages 7A and 12A to thereby produce a drive force. The additional secondary passages 32 end in an additional circular conduit 33, which, if required, can be supplied with fluid 40 via a separate feed line 16.

The vibrations caused by the rotating body 18 are recorded by means of a vibration pick-up device 27 which is also supported on the balancing machine 1. For determination of unbalance forces in several planes, the same principles apply as described above in connection with the embodiments shown in FIG. 2.

FIG. 5 also shows how a uniform distribution of fluid can be achieved in the opening 35 between the inside 24 of the bore and the outside 36 of the arbor. Such uniform distribution is accomplished by means of using porous parts 34 in the stepped arbor 29. Similar porous parts (not shown) may be used in the arbor 5. If the bodies to be balanced are such that they can easily be destroyed by localized impact of support and drive fluid, the entire stepped arbor 29 or the arbor 5 can consist of porous material in the area of the bearing rest for the rotating body 18 to be balanced.

The swing bridge 4 with arbor 5 or arbor 29 can be used in all measurement procedures for determination of the unbalance in respect to position and magnitude, and it is not limited to the use of a specific type of vibration pick-up device. Thus, it is possible to use velocity pick-ups, force pick-up, accelerometers, as well as proximity vibration pick-ups.

Similarly, the invention is not limited to a so-called supercritical (soft bearing) support of the swing bridge on the balancing machine, but subcritically supported (hard bearing) swing bridge can also be used in the same manner.

Nor is this procedure and the swing bridge 4 with arbors 5 or 29 limited to a specific type of rotor without journals. Thus, for instance, it can be used for the balancing of e.g. turbine wheels, compressor wheels, flywheels, and motor vehicle wheels.

FIG. 6 illustrates another embodiment of the invention wherein the collar 41 of the plate 11 includes curved channels 42 in the upper surface 13. The curved channels radiate outwardly from the interior of the surface 13 to the outer circumference thereof and allow a directional flow of the fluid. The flow of fluid through the curved channels also assists in rotating the body being balanced by producing forces that move the body in the desired direction. Alternatively, the channels may have an opposite curvature for braking the rotating body, if desired.

What is claimed is:

1. A procedure for balancing rotating bodies (rotors without journals) comprising the steps of mounting the body to be balanced directly onto a non-rotating arbor, directing fluid under pressure between the outside surface of the arbor and inside surface of the body to thereby separate the body from the arbor, rotating the body relative to the arbor, and determining the position and magnitude of the body unbalance by measuring vibration of the non-rotating arbor resulting from unbalance of the rotating body.

2. A procedure as in claim 1 wherein the fluid is directed between the outside surface of the non-rotating arbor and the inside surface of the body at an angle to the body whereby the force of the fluid causes the body to rotate relative to the arbor.

* * * * *